United States Patent [19]

Yajima

[11] Patent Number: 4,525,306

[45] Date of Patent: Jun. 25, 1985

[54] METHOD FOR PREVENTION OF OXIDATION OF OILS AND FATS AND SOFT CAPSULES CONTAINING THE TREATED OILS AND FATS

[75] Inventor: Mizuo Yajima, Tokyo, Japan

[73] Assignee: Asama Chemical Co., Ltd., Tokyo, Japan

[21] Appl. No.: 404,747

[22] Filed: Aug. 3, 1982

[30] Foreign Application Priority Data

Sep. 21, 1981 [JP] Japan ................. 56-147822
Oct. 20, 1981 [JP] Japan ................. 56-166363

[51] Int. Cl.$^3$ ................................ C11B 5/00
[52] U.S. Cl. ................................ 260/428.5
[58] Field of Search ................................ 260/398.5

[56] References Cited

U.S. PATENT DOCUMENTS

| | | | |
|---|---|---|---|
| 2,342,162 | 2/1944 | Musher | 260/398.5 X |
| 2,434,789 | 1/1948 | Buxton | 260/398.5 X |
| 2,744,834 | 5/1956 | Robinson | 260/398.5 X |
| 2,752,314 | 6/1956 | Clopton | 260/398.5 X |
| 2,975,066 | 3/1961 | Baker et al. | 260/398.5 X |
| 3,502,594 | 3/1970 | Ahrens | 260/398.5 X |
| 3,573,936 | 4/1971 | Karchmar et al. | 260/398.5 X |
| 3,591,665 | 7/1971 | Kimura et al. | 260/398.5 X |
| 4,363,823 | 12/1982 | Kimura et al. | 260/398.5 X |

*Primary Examiner*—Helen M. S. Sneed
*Attorney, Agent, or Firm*—Flynn, Thiel, Boutell & Tanis

[57] ABSTRACT

Oils and fats, especially highly unsaturated, are prevented from oxidation by the step of adding to the oils and fats 0.01 to 10 percent by weight, based on the weight of the oils and fats, of an antioxidant component which has been obtained by extracting with a polar solvent a raw material such as herb spices, residues after collection of essential oil from herb spices, oleo-resin extracted from herb spices with a polar solvent, oleo-resin extracted from herb spices with a non-polar solvent and residues after extraction of herb spices, steam-distilling the extract and collecting the insoluble from the residues of the steam distillation. Soft capsules containing the treated oils and fats are also provided.

8 Claims, No Drawings

METHOD FOR PREVENTION OF OXIDATION OF OILS AND FATS AND SOFT CAPSULES CONTAINING THE TREATED OILS AND FATS

The present invention relates to a method for preventing oils and fats, especially highly unsaturated oils and fats, from oxidation and further soft capsules in which the treated oils and fats are encapsulated. In particular, the invention provides soft capsules for oils and fats containing linoleic acid, linolenic acid, eicosapentaenoic acid or docosahexaenoic acid.

The prevention of the oxidation of oils and fats is accomplished by physical means such as keeping oils and fats away from oxygen and storing them at low temperatures and by chemical means such as adding antioxidants such as BHA, BHT, and tocopherol, or by both means. BHA refers to butylated hydroxyanisole. BHT refers to butylated hydroxytoluene.

Recent studies on oils and fats from the standpoint of nutritional science as well as caloric value revealed that highly unsaturated fatty acids such as eicosapentaenoic acid play an important role. High unsaturation makes oils and fats vulnerable to oxidation and makes their handling very difficult.

Such oils and fats containing highly unsaturated fatty acids are found in familiar fish like sardines and mackerel. Fish oil of these fishes is not used as such because of its poor oxidation stability. For instance, fish oil is mostly separated when fish is processed into fish meal and the separated fish oil is consumed for industrial use. Thus the nutritional value of highly unsaturated fatty acid is not utilized effectively.

Soybean oil, corn oil, cottonseed oil, etc. which are used for food are comparatively stable when stored in a sealled state. They can also be stabilized when incorporated with BHA, BHT, tocopherol, and other antioxidants. However, in the case of oils and fats like fish oil containing highly unsaturated fatty acids, the above-mentioned means are not effective for stabilization. They would not be edible any longer due to oxidation when they have reached consumers.

Common antioxidants like BHA, BHT, and tocopherol, which are used for prevention of oxidation, are effective in proportion to the quantity added up to a certain level. Beyond this level, the antioxidant effect does not increase any more, but rather oxidation is promoted. It is considered that the antioxidant itself has an action to promote oxidation.

These antioxidants are usually added to oils and fats in an amount of 50 to 300 ppm. When they are added in larger amounts, the antioxidant effect does not increase any longer, but it rather decreases. Therefore, in the case where a sufficient effect is not obtained with the aforesaid quantity of addition, it is impossible to prevent oxidation with such antioxidants. The above-mentioned conventional antioxidants in an amount of 50 to 300 ppm are not sufficiently effective for oils and fats containing highly unsaturated fatty acids. They even adversely affect the results they used in an amount more than that. Therefore, practically they cannot be used as the antioxidant for oils and fats containing highly unsaturated fatty acids.

Oils and fats are formed through ester linkages of glycerin and fatty acid. There are a great variety of fatty acids and they are different in physical and chemical properties when viewed from the standpoint of nutritional science. As a matter of course, the oils and fats derived from them greatly vary in their properties.

Much has been studied on oils and fats from the standpoint of nutritional science. It is known that oils and fats may be divided into two categories, i.e., oils and fats composed of oleic acid, palmitic acid, stearic acid, etc. which are effective merely as a calorific source, and oils and fats composed of linoleic acid, linolenic acid, and arachidonic acid which are essential fatty acids indispensable for nutritional, as well as being a calorific source. Essential fatty acids are said to be effective for prevention and treatment of hardening of the arteries and heart diseases.

For the reasons mentioned above, it is desirable from the nutritional point of view to ingest oils and fats containing a large quantity of essential fatty acids such as linoleic acid and linolenic acid. However, saturated oils and fats composed of saturated fatty acids are resistant to oxidation, whereas oils and fats become vulnerable to oxidation as the constituent fatty acids increase in the degree of unsaturation. For example, linseed oil containing linolenic acid in large quantities is easy to oxidize and polymerize, and therefore it is used as a paint but hardly used as a food.

Recently, it has become known that highly unsaturated fatty acids play an important role from the standpoint of nutritional science, and oils and fats containing highly unsaturated fatty acids are drawing attention. Eicosapentaenoic acid contained in large quantities in fish oil of mackerel and sardines is said to be effective for prevention of thrombi. Eicosapentaenoic acid is a highly unsaturated fatty acid containing as many as five double bonds and is very easy to oxidize. Highly unsaturated oils and fats, however fresh they might be when extracted from sardines and mackerel, will soon become oxidized and polymerized when delivered to consumers. Such degraded ones are valueless in nutrition, but they could rather be toxic depending on the degree of oxidation and polymerization.

It has been found by the present inventors that an antioxidant component extracted from spices is as effective as or more effective than BHA, BHT, and tocopherol with the usual quantity of addition, and it exhibits its antioxidants effect more as it is added more. It was also found that the addition of such an antioxidant component in a large quantity prevents the oxidation of oils and fats containing highly unsaturated fatty acids which are oxidized easily. The present invention is based on these findings. The method of this invention is effective not only for oils and fats containing highly unsaturated fatty acids but also for common oils and fats which are used under extremely oxidative conditions.

According to the invention, oils and fats, especially highly unsaturated, are prevented from oxidation by the step of adding to the oils and fats 0.01 to 10 percent by weight, based on the weight of the oils and fats, of an antioxidant component which has been obtained by extracting with a polar solvent a raw material such as herb spices, residues after collection of essential oil from herb spices, oleo-resin extracted from herb spices with a polar solvent, oleo-resin extracted from herb spices with a non-polar solvent and residues after extraction of herb spices, steam-distilling distilling the extract and collecting the insoluble from the residues of the steam distillation. Soft capsules containing the treated oils and fats are also provided.

Oils and fats to be treated by the method according to the invention preferably include those having 18 to 20 carbon atoms, especially having a plurality of unsaturation groups, such as arachiodonic acid, linoleic acid, linolenic acid, eicosapentaenoic acid and docosahexaenoic acid. The invention is effective particularly to eicosapentaenoic acid and docosahexaenoic acid, because they have 5 and 6 unsaturations, respectively.

The raw materials for the antioxidant component to be used according to this invention are herb spices such as sage, rosemary, marjoram, thyme, oregano, and basil. These spices are used in the forms of powder; residues remaining after collecting oil therefrom by steam distillation; oleo-resin extracted with polar solvents such as ethyl ether, ethylene chloride, dioxane, acetone, ethanol, methanol, aqueous ethanol, ethyl acetate, propylene glycol, and glycerin; oleo-resin after extraction with non-polar solvents such as n-hexane, petroleum ether, ligroin, cyclohexane, carbon tetrachloride, chloroform, dichloromethane, 1,2-dichloroethane, toluene, and benzene; and residues remaining after extraction.

The antioxidant component is obtained from these raw materials by the following steps. The raw material is extracted with more than the equal volume of a polar solvent such as ethyl ether, ethylene chloride, dioxane, acetone, ethanol, aqueous ethanol of concentration higher than 65% (v/v), methanol, ethyl acetate, propylene glycol, and glycerin, with refluxing. The extract and residues are separated in the usual way such as filtration, centrifugation, and decantation, preferably with heating. The residues are treated in the same way as above to give an extract, and the first extract and the second extract are combined together. The resulting extract is incorporated with an adsorbent such as activated carbon, diatomaceous earth, and acid clay to decolor chlorophyll and other pigments.

The resulting solution (assuming a light brown color to dark brown color, with green pigment removed) is condensed by distillation under normal pressure or reduced pressure with heating to a temperature close to the boiling point of the solvent used for extraction. Thus a viscous substance or a lump assuming a dark brown to black color is obtained. This substance is dispersed, with agitation, in ten times (by weight) as much water as the substance. The dispersion undergoes steam distillation under normal pressure or reduced pressure. The essential oil component emitting a fragrance characteristic of the raw material spice is dissipated and removed from the water by this steam distillation. The dissipation of the essential oil component may be accelerated by blowing steam into the water during the steam distillation.

The steam distillation is continued to such an extent that the essential oil component is not detected in the distillation any longer. The residues of steam distillation are separated into a dark brown water layer and yellowish brown solids (insolubles) in the usual way such as filtration, centrifugation, and decantation, when hot or after cooling. The solids are collected and dried. Thus a powdery fraction having an extremely light brown color is obtained.

In the decoloration step of the invention, the adsorbent is used in an amount of 1 to 20% based on the weight of the raw material spice. This adsorbent is added to the above-mentioned extract, and the extract is refluxed for 10 to 60 min. and the adsorbent is filtered off. This step is usually repeated twice. In this way, the decoloration step and then the concentration step may be preferably conducted in the invention.

The solid or powdery fraction thus prepared is used as the antioxidant in this invention. This is almost free of the fragrance characteristic of spices and has an extremely powerfl antioxidant effect. Incidentally, the dark brown water layer obtained from the residues of the aforesaid steam distillation has a strong bitter taste, and the residues obtained from it by evaporation to dryness has almost no antioxidant effect.

The antioxidant component prepared as above is added to oils and fats in an amount of 0.01 to 10%, preferably 0.05 to 2% (w/w), more preferably 0.1 to 1% (w/w). The antioxidant component is sufficiently effective even when used alone, but it may be used in combination with a phospholipid or ethyl alcohol or both for increased antioxidant effect due to synergistic effect. The phospholipid includes soybean lecithin and egg yolk lecithin. They are used in the form of purified powder or paste, or in the form of liquid or paste dissolved in oils and fats. The lecithin is added to oils and fats in an amount from 0.1 to 5% (w/w), preferably from 0.2 to 3% (w/w), and the ethyl alcohol is added to oils and fats in an amount from 1 to 10% (w/w), preferably from 2 to 5% (w/w).

These antioxidant, phospholipid, and ethyl alcohol are added to oils and fats in a very simple manner; a prescribed quantity of them is simply dissolved with stirring, and with heating if required. The antioxidant, phospholipid, and ethyl alcohol, preferably having a purity of larger than 90%, may be mixed together prior to addition to oils and fats, or they may be added individually.

It is another object of this invention to provide soft capsules containing the above obtained oils and fats, especially unsaturated, which have a sufficient stability. The antioxidant component extracted from spices as used in this invention increases in antioxidant effect as the quality of addition is increased. Thus it is possible to prevent the oxidation of highly unsaturated oils and fats by increasing the concentrations of their addition. Encapsulation keeps air away and stabilizes highly unsaturated oils and fats encapsulated therein.

The soft capsules obtained as above contain 0.01 to 10% (w/w), based on the weight of the oils and fats, of the antioxidant component, preferably 0.05 to 2% (w/w). The phospholipid to be used in combination is added in an amount of 0.01 to 10% (w/w), preferably 0.05 to 2% (w/w) for unsaturated oils and fats. The ethyl alcohol is added in an amount of 1 to 3% (w/w), preferably 2 to 20% (w/w). The antioxidant component extracted from spices may be combined with a phospholipid or ethyl alcohol or both. The may be added to unsaturated oils and fats in any order. They may be added individually or in the form of a mixture.

Unsaturated oils and fats thus stabilized are encapsulated into soft capsules by a conventional method, whereby the soft capsules containing stable unsaturated oils and fats of this invention are prepared. A practical form of the soft capsules is encapsuled with gelatin.

The invention will now be described in detail with reference to the following examples.

REFERENTIAL EXAMPLE 1

One hundred grams of sample spieces (sage, rosemary, marjoram, and thyme) was extracted with 300 ml of 95% ethanol with refluxing for 1 h. The extract and residues were separated by filtration. The residues were extracted again with 300 ml of 95% ethanol with refluxing for 1 h. The extract and residues were separated by filtration. The extracts were combined and refluxed for 30 min., with 5 g of activated carbon added thereto. After removal of activated carbon by filtration, 5 g of activated carbon was added to the supernatant liquid, and the same operation was repeated. The resulting solution (ethanol extract), with green pigment removed, was heated under reduced pressure to about 70° C. to distill away ethanol. A brown viscous substance or lump was obtained. Subsequently, this substance was suspended in ten times as much water as the substance. The suspension was boiled with stirring and the remaining essential oil was removed by steam distillation. The residues remaining after steam distillation was separated by filtration after cooling, and the brown water layer was removed and the light brown insoluble was collected. This was dried and a powdery antioxidant component was obtained.

The yield and effect of the antioxidant component are shown in Table 1. The antioxidant effect was measured according to AOM method using lard as follows: The powder of each spice and the antioxidant component were added in amounts of 0.1% and 0.02%, respectively, to 20 g of purified molten lard placed in a test tube. The lard was heated at 97.5±0.5° C. in a constant temperature oil bath, with forced air circulation at 2.33 ml/s. The lard was sampled at proper intervals and the peroxide value (POV) was measured according to the improved Lea method. For the purpose of comparison, the same experiment was carried out using 0.02% of butylhydroxyanisole (BHA).

TABLE 1

| Samples | Time (hours) | | | | |
|---|---|---|---|---|---|
| | 18 | 47 | 70 | 95 | 120 |
| Sage powder | 3.0 | 6.8 | 15.3 | 259.0 | — |
| Antioxidant component (Yield: 5.5%) | 2.5 | 7.1 | 12.2 | 18.2 | 27.9 |
| Rosemary powder | 2.8 | 4.9 | 11.3 | 26.6 | 405.2 |
| Antioxidant component (Yield: 10.5%) | 3.1 | 6.3 | 10.6 | 14.5 | 20.2 |
| Thyme powder | 5.5 | 25.8 | 647.4 | — | — |
| Antioxidant component (Yield: 3.1%) | 3.3 | 7.7 | 12.1 | 15.4 | 40.3 |
| Marjoram powder | 5.8 | 32.8 | 762.3 | — | — |
| Antioxidant component (Yield: 2.5%) | 5.0 | 15.7 | 97.1 | — | — |
| BHA 0.02% | 5.5 | 21.4 | 84.3 | — | — |
| Control (lard alone) | 15.0 | 36.2 | 858.3 | — | — |

REFERENTIAL EXAMPLE 2

The same procedures as in Referential Example 1 were conducted and results are shown in Table 2.

TABLE 2

| Samples | Yield (%) | Time (hours) | | | | |
|---|---|---|---|---|---|---|
| | | 15 | 10 | 15 | 20 | 25 |
| Sage powder | — | — | 4 | 6 | 9 | 13 |
| Extracted antioxidant | 4.8 | | | | | |
| Rosemary powder | — | — | 4 | 7 | 10 | 14 |
| Extracted antioxidant | 10.3 | | | | | |
| Thyme powder | — | — | 8 | 12 | 20 | 28 |
| Extracted antioxidant | 2.9 | | | | | |
| Marjoram powder | — | | | | | |
| Extracted antioxidant | 2.2 | — | 9 | 15 | 23 | 31 |
| BHA 0.02% | — | — | 7 | 12 | 18 | 25 |
| Control (lard alone) | — | 15 | 41 | 128 | | |

EXAMPLE 1

Fresh mackerel were ground and fish oil was extracted by heating. After purification, 30 g each of the fish oil was placed in a 100 ml Erlenmyer flask with ground stopper. BHT and the antioxidant component were added in amounts as shown in Table 2. During storage at 60° C., sampling was made every day for measurement of POV. The antioxidant component used in this Example was repeated from rosemary. It is to be noted from Table 2 that BHA is effective very little, and the effect is not improved even when the quantity of addition was decreased. As opposed to this, the antioxidant component extracted from rosemary increases in the antioxidant effect as the quantity of addition is increased.

TABLE 3

| | Days of Storage | | | | |
|---|---|---|---|---|---|
| | 1 | 2 | 3 | 4 | 5 |
| Control | 15.23 | 35.09 | 66.61 | 108.64 | — |
| BHA | | | | | |
| 100 ppm | 15.05 | 35.77 | 66.25 | 107.9 | — |
| 300 ppm | 14.49 | 33.87 | 65.36 | 104.54 | — |
| 500 ppm | 14.40 | 33.14 | 64.79 | 103.12 | — |
| 1000 ppm | 13.99 | 33.21 | 62.28 | 98.37 | — |
| Antioxidant | | | | | |
| 300 ppm | 14.16 | 34.60 | 50.23 | 87.70 | — |
| 500 ppm* | 12.50 | 19.76 | 37.59 | 59.58 | 85.10 |
| 1000 ppm* | 12.22 | 18.56 | 29.74 | 47.64 | 72.32 |
| 2000 ppm* | 10.35 | 15.16 | 19.31 | 26.70 | 42.31 |

*This invention
Note:
The initial POV of fish oil was 7.36.

EXAMPLE 2

This example was carried out to confirm the synergistic effect which is exhibited when the antioxidant component is used in combination with a phospholipid and ethyl alcohol. The same oils and fats as used in Example 1 were employed. The antioxidant component extracted from sage and rosemary, commercial soybean lecithin (60 w/w%), and 95 v/v% ethyl alcohol were used in amounts as shown in Tables 5 and 6. It is to be noted from these tables that the antioxidant effect increases when lecithin and ethyl alcohol are added even when the quantity of the antioxidant was the same.

TABLE 5

(Antioxidant extracted from sage)

| | Days of storage | | | | |
|---|---|---|---|---|---|
| | 2 | 3 | 4 | 5 | 6 |
| Control | 35.09 | 66.61 | 108.64 | | |
| Antioxidant component 0.2% | 16.77 | 20.45 | 33.11 | 52.53 | 76.96 |
| Lecithin used in combination* | | | | | |
| 1% | 12.03 | 16.64 | 23.17 | 28.88 | 35.61 |
| 3% | 9.82 | 12.30 | 18.21 | 22.55 | 25.68 |
| 5% | 7.95 | 10.22 | 12.97 | 16.00 | 20.91 |
| Ethyl alcohol used in combination* | | | | | |
| 2% | 16.65 | 20.40 | 32.64 | 51.78 | 73.05 |
| 4% | 15.73 | 19.11 | 30.85 | 42.46 | 61.38 |
| 8% | 14.03 | 17.46 | 27.43 | 38.88 | 49.14 |
| Lecithin and ethyl alcohol used in combination* | | | | | |
| Lecithin + Ethyl alcohol | | | | | |
| 5% + 2% | 7.91 | 9.85 | 12.30 | 14.78 | 18.97 |
| 5% + 4% | 7.60 | 8.33 | 10.01 | 11.47 | 13.45 |
| 5% + 8% | 7.57 | 7.97 | 8.56 | 9.63 | 11.48 |

Note:
The antioxidant component was added in amount of 0.2% in all cases.

TABLE 6

(Antioxidant extracted from rosemary)

| | Days of storage | | | | |
|---|---|---|---|---|---|
| | 2 | 3 | 4 | 5 | 6 |
| Control | 35.09 | 66.61 | 108.64 | | |
| Antioxidant component 0.2% | 15.16 | 19.31 | 26.70 | 42.31 | 62.44 |
| Lecithin used in combination* | | | | | |
| 1% | 10.85 | 13.84 | 20.62 | 22.34 | 24.78 |
| 3% | 8.93 | 10.67 | 15.61 | 18.54 | 19.50 |
| 5% | 7.96 | 9.62 | 10.91 | 13.19 | 14.94 |
| Ethyl alcohol used in combination* | | | | | |
| 2% | 14.88 | 19.20 | 26.66 | 40.50 | 59.37 |
| 4% | 14.15 | 18.59 | 26.32 | 36.64 | 51.20 |
| 8% | 13.14 | 15.57 | 25.75 | 35.52 | 39.54 |
| Lecithin and ethyl alcohol used in combination* | | | | | |
| Lecithin + Ethyl alcohol | | | | | |
| 5% + 2% | 7.88 | 8.32 | 10.01 | 11.58 | 14.67 |
| 5% + 4% | 7.63 | 7.65 | 8.35 | 8.86 | 9.21 |
| 5% + 8% | 7.51 | 7.56 | 8.11 | 8.86 | 9.05 |

Note:
The antioxidant component was added in amount of 0.2% in all cases.

EXAMPLE 3

Fish oil extracted from fresh mackerel was purified. The fish oil was incorporated with ingredients as shown in Table 7 and then made into soft capsules in the usual way. The resulting soft capsules were stored at 45° C. and five capsules were sampled from each group at 15-day intervals. The POV of the samples was measured as in Referential Example 2.

It is to be noted that the soft capsules of this invention are very stable.

TABLE 7

| | | Storage Period (days) | | | |
|---|---|---|---|---|---|
| | | 15 | 30 | 45 | 60 |
| Controls | | | | | |
| No addition | | 31 | 149 | 420 | — |
| Experimental groups of this invention | | | | | |
| Extracted antioxidant | 0.01% | 21 | 64 | 161 | — |
| Extracted antioxidant | 0.2% | 18 | 55 | 119 | 220 |
| Extracted antioxidant Soybean lecithin | 0.2% 0.5% | 9.2 | 24 | 62 | 132 |
| Extracted antioxidant Soybean lecithin | 0.2% 1.0% | 8.3 | 22 | 50 | 107 |
| Extracted antioxidant Ethyl alcohol | 0.2% 1.0% | 17 | 52 | 109 | 192 |
| Extracted antioxidant Ethyl alcohol | 2.0% 5.0% | 14 | 41 | 94 | 175 |
| Extracted antioxidant Soybean lecithin Ethyl alcohol | 0.2% 0.5% 2.0% | 5.2 | 17 | 43 | 91 |

Note:
The antioxidant was extracted from rosemary.

EXAMPLE 4

Fish oil extracted from sardines was purified and condensed to give highly unsaturated oil containing 25% of eicosapentaneoic acid and 15% of docosahexaneoic acid. After addition of the ingredients as shown in Table 8, soft capsules were prepared. The soft capsules were stored at 45° C. and five capsules were sampled from each group at 14-day intervals. The POV of the highly unsaturated oil in the capsules was measured. The results are shown in Table 8.

It is to be noted that the soft capsules of this invention are very stable.

TABLE 8

| | | Storage Period (days) | | | | |
|---|---|---|---|---|---|---|
| | | 0 | 14 | 28 | 42 | 56 |
| Controls | | | | | | |
| No addition | | 3.2 | 35 | 67 | 109 | — |
| BHA 0.02% | | — | 31 | 42 | 63 | 103 |
| Tocopherol 0.02% | | — | 32 | 39 | 58 | 86 |
| Experimental groups of this invention | | | | | | |
| Extracted antioxidant A | 0.05% | — | 27 | 34 | 52 | 75 |
| Extracted antioxidant B | 0.05% | — | 23 | 30 | 47 | 72 |
| Extracted antioxidant A Soybean lecithin | 0.05% 0.1% | — | 20 | 28 | 37 | 48 |
| Extracted antioxidant B Soybean lecithin | 0.05% 0.1% | — | 18 | 24 | 31 | 40 |
| Extracted antioxidant A Ethyl alcohol | 0.05% 8% | — | 14 | 20 | 29 | 40 |
| Extracted antioxidant B Ethyl alcohol | 0.05% 8% | — | 12 | 17 | 26 | 38 |
| Extracted antioxidant A Soybean lecithin Ethyl alcohol | 0.05% 0.1% 8% | — | 7.1 | 12 | 18 | 38 |
| Extracted antioxidant B Soybean lecithin Ethyl alcohol | 0.05% 0.1% 8% | — | 6.2 | 9.9 | 15 | 24 |

Antioxidant A was extracted from sage.
Antioxidant B was extracted from rosemary.

The embodiments of the invention in which an exclusive property or privlege is claimed are defined as follows:

1. A soft gelatin capsule filled with an edible fish oil containing eicosapentaneoic acid and docosahexaenoic acid, said edible fish oil containing admixed therewith from 0.01 to 10 percent by weight of an antioxidant component, based on the weight of said oil, said antioxidant component having been obtained by extracting (A) a starting material selected from the group consisting of herb spices, residues obtained after collecting essential oils from herb spices, oleoresins obtained by extracting herb spices with a polar solvent, oleoresins obtained by extracting herb spices with a non-polar solvent and residues remaining after extraction of herb spices, with (B) a polar solvent whereby to obtain an extract, then steam distilling the extract and then recovering the insoluble part from the residue of the steam distillation, as said antioxidant component.

2. A capsule as claimed in claim 1, in which the amount of said antioxidant component is from 0.05 to 2 percent by weight, based on the weight of said oil.

3. A capsule as claimed in claim 1, in which decoloration and concentration of the extract are conducted before the steam distillation step.

4. A capsule as claimed in claim 2, in which said herb spices are selected from the group consisting of sage, rosemary, marjoram, thyme, oregano and basil.

5. A capsule as claimed in claim 1 in which said oil further contains from 0.01 to 10 percent by weight, based on the weight of the oil, of a phospholipid effective to improve the antioxidation effect of said antioxidant component.

6. A capsule as claimed in claim 1 in which said oil further contains from 1 to 30 percent by weight, based on the weight of the oil, of ethyl alcohol.

7. A capsule as claimed in claim 1 in which said oil contains from 0.01 to 10 percent by weight, based on the weight of the oil, of a phospholipid effective to improve the antioxidation effect of said antioxidant component, and from 1 to 30 percent by weight, based on the weight of the oil, of ethyl alcohol.

8. A capsule as claimed in claim 7 in which said oil contains from 0.05 to 2 percent by weight of said antioxidant component, from 0.05 to 2 percent by weight of said phospholipid and from 2 to 20 percent by weight of said ethyl alcohol, all percentages being based on the weight of the oil.

* * * * *

UNITED STATES PATENT AND TRADEMARK OFFICE
CERTIFICATE OF CORRECTION

PATENT NO. : 4 525 306
DATED : June 25, 1985
INVENTOR(S) : Mizuo Yajima

It is certified that error appears in the above-identified patent and that said Letters Patent is hereby corrected as shown below:

Column 8, line 54; change "claim 2" to ---claim 1---.

Signed and Sealed this

Twenty-first Day of January 1986

[SEAL]

Attest:

DONALD J. QUIGG

Attesting Officer

Commissioner of Patents and Trademarks